United States Patent [19]

Hashimoto et al.

[11] 4,088,933

[45] May 9, 1978

[54] DC MOTOR PHASE CONTROL SYSTEM

[75] Inventors: Yoshihiro Hashimoto, Hachioji; Shigeki Kawada, Hino; Katsuo Kohari, Tachikawa; Hiroshi Ishida, Tokyo, all of Japan

[73] Assignee: Fujitsu Fanuc Limited, Tokyo, Japan

[21] Appl. No.: 711,156

[22] Filed: Aug. 3, 1976

[30] Foreign Application Priority Data

Aug. 8, 1975 Japan .................................. 50/96331

[51] Int. Cl.$^2$ ............................................. H02P 5/16
[52] U.S. Cl. ..................................... 318/257; 318/269
[58] Field of Search ..................... 318/257, 258, 269

[56] References Cited

U.S. PATENT DOCUMENTS

| 3,612,974 | 10/1971 | Wolf et al. ............... 318/257 X |
| 3,882,365 | 5/1975 | Yemington ................. 318/269 |
| 3,916,276 | 10/1975 | Ottoson ..................... 318/269 |
| 3,947,737 | 3/1976 | Kimura et al. .............. 318/257 |

Primary Examiner—Robert K. Schaefer
Assistant Examiner—W. E. Duncanson, Jr.
Attorney, Agent, or Firm—Daniel Jay Tick

[57] ABSTRACT

A DC motor phase control system is provided in a system having a first controlled rectifier connected to an AC power supply and providing a positive rectified output and a second controlled rectifier providing a negative rectified output. A DC motor is controlled for forward and reverse rotation and is controlled in speed by the firing control of the rectifiers. The pulse indicating the zero point of the AC power supply voltage is delayed according to the actual speed of the motor and the delayed pulse is used as a reference pulse of the controlled firing pulses applied to the controlled rectifiers.

4 Claims, 19 Drawing Figures

FIG. 1
PRIOR ART
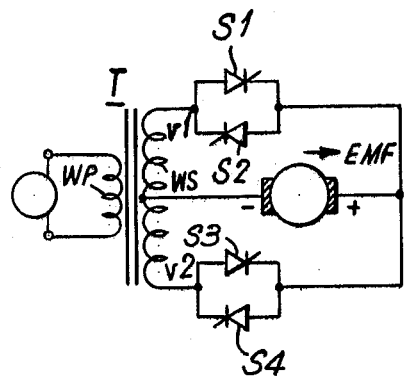
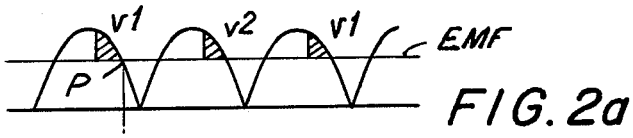
TRANSFORMER SECONDARY
VOLTAGES SHOWING
FIRING PERIODS
FIG. 2a
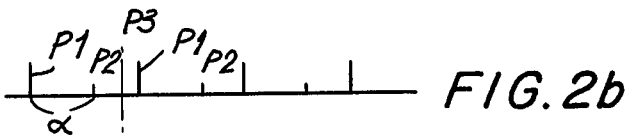
SYNCHRONOUS AND
FIRING PULSES
FIG. 2b
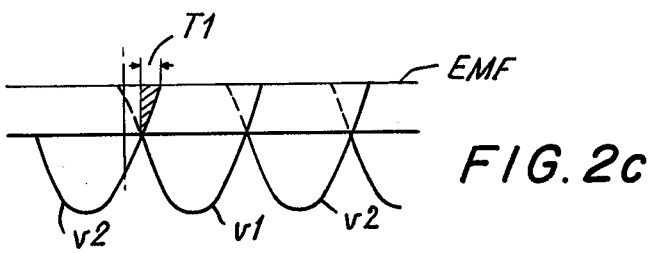
FIRING PERIODS
SHOWING BRAKING
FORCE
FIG. 2c
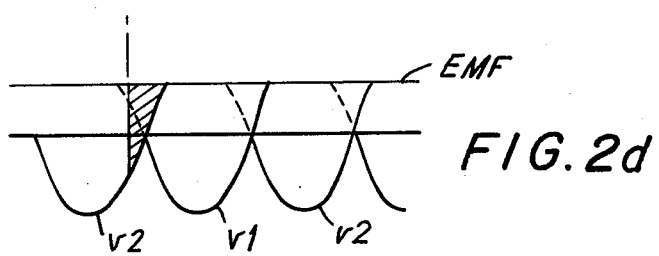
FIRING PERIODS
SHOWING BRAKING
FORCE
FIG. 2d
ARMATURE CURRENT
FIG. 2e

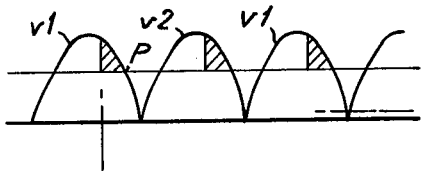
TRANSFORMER SECONDARY VOLTAGES SHOWING FIRING PERIODS
FIG.3a
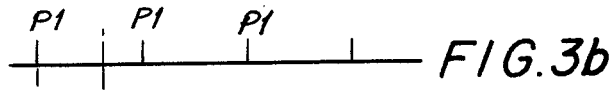
REFERENCE PULSES
FIG.3b
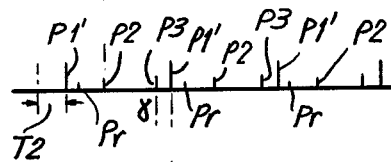
REFERENCE AND FIRING PULSES
FIG.3c
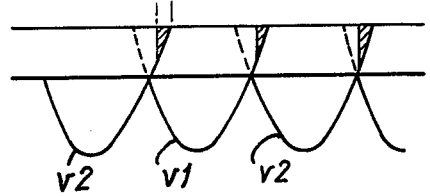
FIRING PERIODS SHOWING BRAKING FORCE
FIG.3d
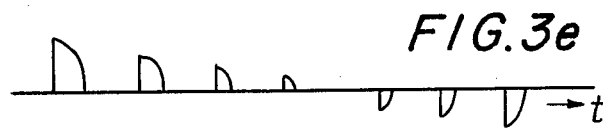
ARMATURE CURRENT
FIG.3e
FIG.4a
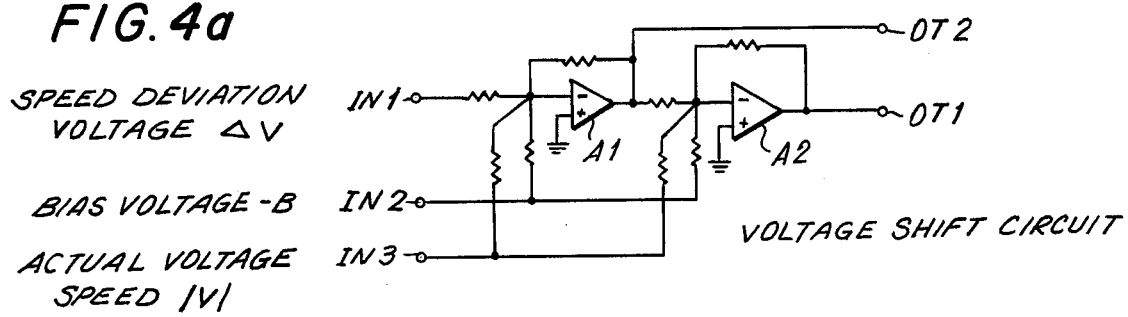
SPEED DEVIATION VOLTAGE $\Delta V$    IN1
BIAS VOLTAGE $-B$    IN2
ACTUAL VOLTAGE SPEED $|V|$    IN3
VOLTAGE SHIFT CIRCUIT
FIG.4b
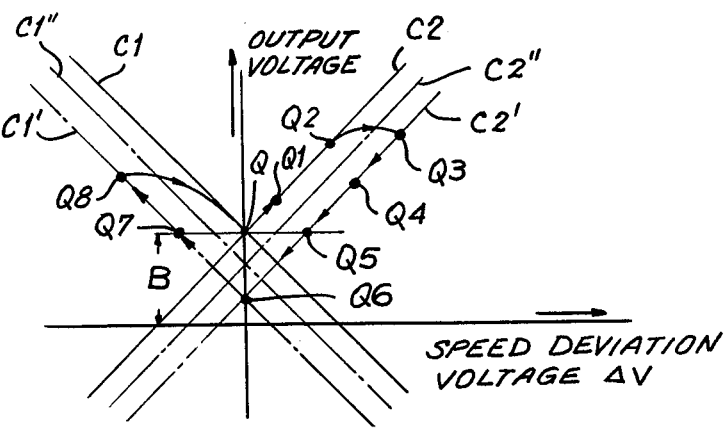

FIG.5
FIRING PULSE GENERATING CIRCUIT
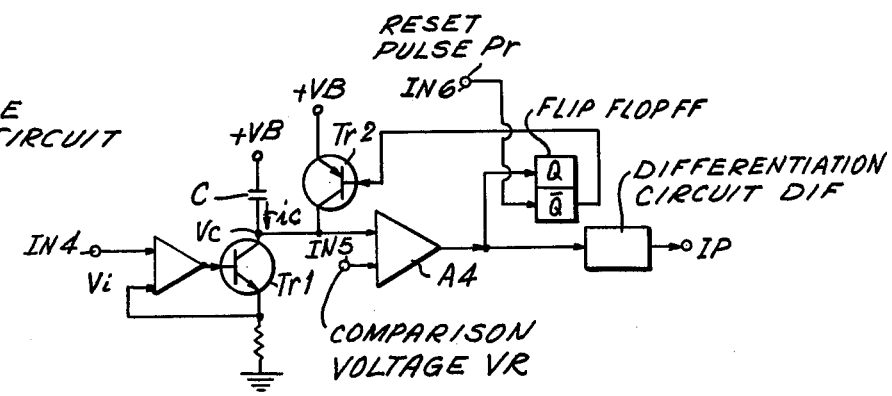
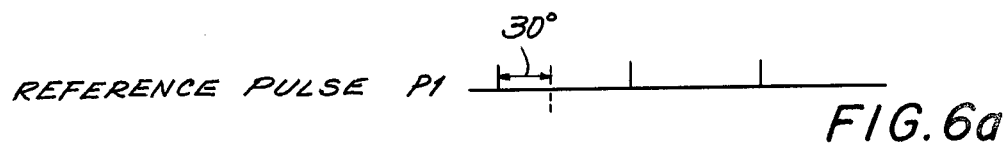
FIG.6a
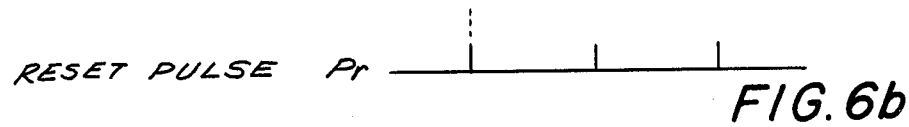
FIG.6b
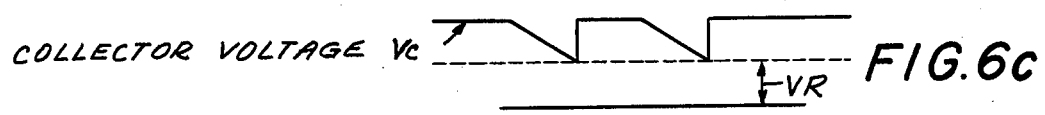
FIG.6c
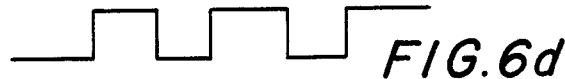
FIG.6d
FIG.6e

DC MOTOR PHASE CONTROL SYSTEM

BACKGROUND OF THE INVENTION

The present invention relates to a DC motor phase control system. More particularly, the invention relates to a phase control system of a DC motor wherein phase control is continuous even during deceleration of the motor.

The control circuit of a DC motor using a controlled rectifier, such as a thyristor, usually comprises a transformer connected to an AC power supply via its primary winding. The anodes of a first pair of thyristors are connected to the opposite end terminals of the secondary winding of the transformer and produce a positive rectified output. The cathodes of a second pair of thyristors are connected to the opposite end terminals of the secondary winding of the transformer and produce a negative rectified output. A DC motor is connected between the cathodes of the first pair of thyristors and the anodes of the second pair of thyristors in common and an intermediate point of the secondary winding of the transformer.

When the first pair of thyristors of the control circuit are in conductive condition or ON, the motor rotates in a forward direction. When the second pair of thyristors are in conductive conditon or ON, the motor rotates in the reverse direction. Thus, the motor speed is controlled by controlling the timing of the conductive periods of the thyristors. That is, the motor speed is controlled by utilizing a firing angle control circuit to control the firing angles of the thyristors.

Usually, firing phase control is provided by obtaining the synchronous pulse at the zero point of the AC power supply voltage and producing a firing pulse at a timing delayed by a specified period from the synchronous pulse. In this firing phase control method, acceleration, deceleration and constant speed control of the motor is continuously provided. Thus, for example, in acceleration control, the firing angle is gradually reduced, the conductive time of the first pair of thyristors for forward rotation of the motor is hastened, and the armature current gradually increases, whereby the speed of motor increases.

On the other hand, a reverse electromotive force proportional to the rotary velocity of the motor is produced across the winding of the motor and the rotary velocity of the motor reaches the specified level after a specified period of time. The reverse electromotive force then becomes constant, so that the acceleration control is completed. When the known motor control circuit is utilized for deceleration control, a longer deceleration time is required for the following reasons. When an attempt is made to shorten the deceleration time, smooth speed control of the motor is unattainable.

When the firing angle is gradually increased, the timing of the conductive periods of the first pair of thyristors is gradually delayed and the armature current is decreased. This results in motor deceleration. When the firing angle is rapidly increased, however, the speed of the motor, and therefore the reverse electromotive force of the motor winding, cannot follow up such a change and does not change rapidly. As a result, after the reverse electromotive force becomes greater than the power supply voltage, the first pair of thyristors are reversely biased. Thereafter, the first pair of thyristors are not fired and the armature current becomes zero, until the motor stops rotating. For this reason, a longer deceleration time is required.

If it is attempted to shorten the deceleration time by firing the second pair of thyristors with a firing pulse of the timing when the reverse electromotive force becomes larger than the power supply voltage, the armature current suddenly flows in the reverse direction and the rotation of the motor is not smooth.

The known control circuit is insufficient for controlling a driving motor for a machine tool which requires high speed and high precision operation. There is thus a need for a DC motor phase control system which shortens the deceleration time of a DC motor and insures smooth deceleration control.

The principal object of the invention is to provide a DC motor phase control system which eliminates the disadvantages of the known control circuit.

An object of the invention is to provide a DC motor phase control system which shortens the deceleration time of a DC motor.

Another object of the invention is to provide a DC motor phase control system which provides smooth deceleration control for a DC motor.

Still another object of the invention is to provide a DC motor phase control system of simple structure, which is inexpensive in manufacture and functions efficiently, effectively and reliably to provide a DC motor with a shorter deceleration time than known systems and with simultaneous smooth deceleration control.

Yet another object of the invention is to provide a DC motor phase control system in which armature current of the motor is changed continuously and smoothly from positive to zero and to negative during the deceleration time by delaying the pulse indicating the zero point of the AC power supply voltage in accordance with the actual motor speed, and by setting the delayed pulse generating time to the reference time of the firing pulse.

Another object of the invention is to provide a DC motor phase control system which provides smooth deceleration control by continuously changing the armature current of the motor to a negative value from a positive value via zero, and to shorten the deceleration time by using negative current as the control current in deceleration control of the motor.

BRIEF SUMMARY OF THE INVENTION

In accordance with the invention, a DC motor phase control system having an AC power supply voltage having a pulse indicating the zero point, a first controlled rectifier connected to the power supply voltage for providing a positive rectified output, a second controlled rectifier connected to the power supply voltage for providing a negative rectified output and a DC motor connected in common to the first and second controlled rectifiers and to the power supply, said motor being controlled for forward rotation, reverse rotation and in speed by said controlled rectifiers in accordance with firing control of said rectifiers, comprises speed determining means for determining the actual speed of the motor. Phase control means is coupled to the speed determining means for delaying the pulse indicating zero point of the AC power supply voltage in accordance with the actual speed of the motor. Means utilizes the delayed pulse as a reference pulse for controlling the firing angles of the controlled rectifiers.

In accordance with the invention, a DC motor phase control system having an AC power supply voltage having a pulse indicating the zero point, a first controlled rectifier connected to the power supply voltage for providing a positive rectified output, a second controlled rectifier connected to the power supply voltage for providing a negative rectified output, and a DC motor connected in common to the first and second controlled rectifiers and to the power supply, comprises a firing angle control circuit connected to the controlled rectifiers for controlling the firing angles of the controlled rectifiers and thereby controlling the motor in speed and direction of rotation. The firing angle control circuit comprises a voltage shift circuit for producing a deviation voltage in accordance with the deviation between a command speed and the actual speed of the motor and for shifting the deviation voltage in accordance with the actual speed of the motor. A firing pulse generating circuit has an input connected to the voltage shift circuit and an output connected to a controlled rectifier for controlling the firing angles of the controlled rectifier in accordance with the output voltage of the voltage shift circuit.

Additional firing pulse generating circuits are provided, each having an input connected to the output of the voltage shift circuit and an output connected to a corresponding one of the controlled rectifiers.

The first controlled rectifier has an anode connected to the power supply voltage, a cathode connected in common to the anode of the second controlled rectifier and the motor and a control electrode connected to the output of the firing pulse generating circuit. The second controlled rectifier has a cathode connected to the power supply voltage, an anode connected in common to the cathode of the first controlled rectifier and the motor and a control electrode connected to the output of the firing pulse generating circuit.

In accordance with the invention, a method of controlling a DC motor in speed and direction of rotation, said motor being controlled in speed and direction of operation in accordance with firing control of controlled rectifiers and powered by an AC power supply voltage having a pulse indicating the zero point, comprises the step of delaying the pulse indicating the zero point in accordance with the actual speed of the motor. The delayed pulse is utilized as a reference pulse of phase-controlled firing pulses applied to the rectifiers.

When the actual speed of the motor is zero, the timing when the instantaneous value of the AC power supply voltage becomes zero is considered the reference timing of the firing pulse. During rotation of the motor, the timing delayed by a period in accordance with the actual speed of the motor from the timing when the AC power supply voltage becomes zero is considered the reference timing of the firing pulse.

In accordance with the invention, a method of smooth deceleration control of a DC motor having an armature, comprises the steps of continuously varying the armature current of the motor to a negative value from a positive value via zero and shortening the deceleration time by using negative current as the motor deceleration control current.

BRIEF DESCRIPTION OF THE DRAWINGS

In order that the invention may be readily carried into effect, it will now be described with reference to the accompanying drawings, wherein:

FIG. 1 is a circuit diagram of a known DC motor control circuit utilizing controlled rectifiers;

FIGS. 2a to 2e are graphical presentations of waveforms for explaining the operation of the known DC motor phase control system;

FIGS. 3a to 3e are graphical presentations of waveforms for explaining the principle of operation of the DC motor phase control system of the invention;

FIG. 4a is a circuit diagram of an embodiment of the voltage shift circuit utilized for phase control in the DC motor phase control system of the invention;

FIG. 4b is a graphical presentation for explaining the operation of the voltage shift circuit of FIG. 4a;

FIG. 5 is a circuit diagram of an embodiment of the firing pulse generating circuit of the DC motor phase control system of the invention; and FIGS. 6a to 6e are graphical presentations showing the operating waveforms at each point of the firing pulse generating circuit.

In the FIGS., the same components are identified by the same reference numerals.

DETAILED DESCRIPTION OF THE INVENTION

The known control circuit of a DC motor, shown in FIG. 1, comprises a transformer T connected to an AC power supply via its primary winding WP. The anodes of a first pair of thyristors S1 and S3 are connected to the opposite end terminals of the secondary winding WS of the transformer T and produce a positive rectified output. The cathodes of a second pair of thyristors S2 and S4 are connected to the opposite end terminals of the secondary winding WS of the transformer and produce a negative rectified output. A DC motor M is connected between the cathodes of the thyristors S1 and S3 and the anodes of the thyristors S2 and S4 in common and an intermediate point of the secondary winding of the transformer. When the thyristors S1 and S3 of the control circuit are in conductive condition or ON, the motor M rotates in forward direction. When the thyristors S2 and S4 are in conductive condition or ON, the motor rotates in the reverse direction. Thus, the motor speed is controlled by controlling the timing of the conductive periods of the thyristors. That is, the motor speed is controlled by utilizing a firing angle control circuit to control the firing angles of the thyristors.

Usually, firing phase control is carried out by obtaining the synchronous pulse at the zero point of the AC power supply voltage and producing a firing pulse at a timing delayed by a specified period from the synchronous pulse. In this firing phase control method, acceleration, deceleration and constant speed control of the motor is continuously provided. Thus, for example, in acceleration control, the firing angle α is gradually reduced, the conductive time of the thyristors S1 and S3 for forward rotation of the motor is hastened, and the armature current gradually increases, whereby the speed of the motor increases.

On the other hand, a reverse electromotive force proportional to the rotary velocity is produced across the winding of the motor and the rotary velocity of the motor reaches the specified level after a specified period of time. The reverse electromotive force then becomes constant, so that the acceleration control is completed. When the known motor control circuit of FIG. 1 is utilized for deceleration control, a longer deceleration time is required for the following reasons. When an attempt is made to shorten the deceleration time, smooth speed control of the motor is unattainable.

When the firing angle is gradually increased, the timing of the conductive periods of the thyristors S1 and S3 is gradually delayed and the armature current is decreased. This results in motor deceleration. When the firing angle is rapidly increased, however, the speed of the motor, and therefore the reverse electromotive force of the motor winding, cannot follow up such a change and does not change rapidly. As a result, after the reverse electromotive force becomes greater than the power supply voltage, the thyristors S1 and S3 are reversely biased. Thereafter, the thyristors S1 and S3 are not fired and the armature current becomes zero, until the motor stops rotating. For this reason, a longer deceleration time is required.

If it is attempted to shorten the deceleration time by firing the thyristors S2 and S4 with a firing pulse of the timing when the reverse electromotive force becomes larger than the power supply voltage, the armature current suddenly flows in the reverse direction and the rotation of the motor is not smooth.

The DC motor phase control system of the invention may be adapted to the control circuit of FIG. 1. As hereinbefore stated, the thyristors S1 and S3 of FIG. 1 produce a positive rectified output and the thyristors S2 and S4 produce a negative rectified output. There are, of course, single phase, half wave rectifying systems, multi-phase half-wave and full wave rectifying systems, in addition to the single phase full wave rectifying system of FIG. 1.

The circuit of FIG. 1 operates in a well known manner. When the thyristors S1 and S3 are conductive or ON, for example, the motor rotates in the forward direction. When the thyristors S2 and S4 are conductive or ON, the motor rotates in the reverse direction. Therefore, the motor speed may be controlled by controlling the timing of the conductive periods. That is, the speed of the motor may be controlled by controlling the firing angle. Usually, firing phase control is provided by obtaining the synchronous pulse at the zero point of the AC power supply voltage and producing a firing pulse at a timing delayed by a specific period from the timing at which the AC power supply voltage becomes zero, wherein the synchronous pulse is used. Firing phase control may be continuous during the acceleration and constant rotation of the motor.

FIG. 2a shows the waveforms of the secondary AC voltages $v1$ and $v2$ of the transformer T applied to the thyristors S1 and S3 and an electromotive force EMF of the motor M. FIG. 2b shows the synchronous pulse P1 produced or generated at the zero point of the AC voltage. When the firing pulse P2 is generated from the synchronous pulse P1 at the firing angle $\alpha$, a current is supplied to the motor M. The current is represented by areas of the AC voltage waveforms $v1$ and $v2$. The motor thus rotates, inducing the reverse electromotive force EMF. When the firing angle $\alpha$ is reduced, the timing of the conductive periods of the thyristors S1 and S3 is hastened and the armature current increases, thereby increasing the rotary speed of the motor. On the other hand, when the firing angle is increased, the timing of the conductive periods of the thyristors is delayed and the armature current is reduced, so that the motor is decelerated.

When the firing angle is rapidly increased, the speed of the motor and therefore the reverse electromotive force, does not vary abruptly and is almost constant during this period. Therefore, the firing pulse is generated at a timing when the reverse electromotive force EMF becomes greater than the power supply voltage $v1$, as shown by the pulse P3 of FIG. 2b. The thyristors S1 and S3 are not fired by the firing pulse P3, and the motor driving current is interrupted.

When the firing pulse P3 is applied to the thyristor S4, an armature current produced by the sum of the voltage $v2$, wherein $v2 = -v1$, which is applied to the thyristor at the time that the pulse P3 is applied, as shown in FIG. 2d. This results in the production of the reverse electromotive force EMF and thereby a considerable brake effect or force. As is apparent from a comparison of FIGS. 2a and 2d, when the firing pulse is generated at a point a little before or after the point P, at which the voltage $v1$ crosses the reverse electromotive force EMF, a comparatively small driving current flows in the former case, while a comparatively large brake current flows in the latter case. In other words, the armature current suddenly changes from positive to negative, as shown in FIG. 2e.

A firing pulse before or after the point P is necessary for keeping the speed of the motor constant by finely adjusting the speed. If this suddenly changes the armature current during the deceleration time, as hereinbefore described, however, it is not desirable, since it results in a large difference in the motor torque, resulting in unsmooth speed control. A small braking force may be obtained here by further delaying the firing pulse, as shown in FIG. 2c. However, it is impossible to delay the firing pulse after the next synchronous pulse. For this reason, the period T1, in which a small braking force is obtained, as shown in FIG. 2c, is not in an available range.

The present invention eliminates the disadvantages of the known circuit and generates a firing pulse even in the period T1, thereby providing smooth constant speed or deceleration control. In the DC motor phase control system of the invention, as in the known circuit of FIG. 1, the first pair of controlled rectifiers or thyristors is connected to the AC power supply and provides a positive rectified output and the second pair of controlled rectifiers or thyristors provides a negative rectified output. The DC motor is controlled for forward and reverse rotation and speed control by the firing control of the rectifiers.

In accordance with the invention, the pulse indicating the zero point of the AC power supply voltage is delayed according to the actual speed of the motor and the delayed pulse is used as the reference pulse of the firing pulse to be phase controlled.

FIGS. 3a to 3e show waveforms for explaining the principle of operation of the phase control system of the invention. FIG. 3a shows the waveforms of power supply voltage $v1$ and $v2$, similarly to FIG. 2a, and FIG. 3b shows the reference pulse P1. In the phase control system of the invention, the reference pulse P1 is shifted according to the actual motor speed. At a high speed, it is delayed by an adequate phase angle or time T2, as shown in FIG. 3c. It is recommended that the time T2 be selected to be equal to the time T1, even in the maximum, if the reverse electromotive force EMF is that at the expected maximum speed.

If the time T2 is selected equal to the time T1, the firing pulse P2 is generated with a delay of a phase angle $\beta$ from the shifted reference pulse P1'. The delay is thus $T2 + \beta$ in terms of the firing angle. The motor M is driven by feeding the current during the period in FIG.

3a. The firing pulse P3 is generated by further delaying the phase angle to γ. A small braking force may be produced by feeding a current to the thyristors for reverse rotation in the period shaded in FIG. 3d. When the firing pulse is applied to the thyristor S2, said thyristor is switched to its conductive or ON condition for over a half cycle, as may be deduced from FIG. 3c. Therefore, the firing pulse is not applied to the thyristor S2.

The firing angle is determined by the control input. The control input is the difference between the speed command and the actual speed of the motor, and ordinarily changes continuously. Since the firing pulse is generated in each cycle, the firing pulse generating time is varied step by step between the phase angles β and γ in accordance with the actual motor speed and then, as is clear from FIG. 3c, when the firing pulse exceeds the cross point of the voltage ν1 and the EMF, the thyristor S1 does not become conductive even if the firing pulse is supplied, and the motor M continues in its condition wherein the current is interrupted.

Succeedingly, the thyristor S4 is switched to its conductive or ON condition, as shown by the shaded area of FIG. 3d, by the firing pulse P3, producing a small braking force. Thus, constant speed control or deceleration control is always smooth. FIG. 3e shows the waveform of the motor armature current in case the thyristor is controlled by shifting the reference pulse P1 according to the actual motor speed. The armature current changes smoothly, as shown by the waveform of FIG. 3e.

When the motor M is operating at low speed, the reverse electromotive force is at a low level, as indicated by EMF' in FIG. 3a. When the motor speed is zero, the reverse electromotive force is zero, that is, on the horizontal axis. In this case, there is no need to shift the reference pulse P1. As may readily be understood, smooth acceleration and deceleration control is provided with reference to the zero point pulse shown in FIG. 3b.

FIG. 4a shows the voltage shift circuit of the invention. The voltage shift circuit is used for shifting the reference pulse P1 in accordance with the actual motor speed. FIG. 4b explains the operation of the voltage shift circuit.

The voltage shift circuit of FIG. 4a comprises inverting amplifiers A1 and A2 connected in series. The difference between the speed command voltage and the actual motor speed voltage, that is, the speed deviation voltage ΔV, appears at an input terminal IN1. A bias voltage −B is provided at the input terminal IN2. The absolute value |V| of the actual motor speed is provided at an input terminal IN3.

In FIG. 4b, the abscissa represents the speed deviation voltage ΔV and the ordinate represents the output voltage. The output indicated by lines C1 and C2 of FIG. 4b may be provided at the output terminals OT1 and OT2 of the voltage shift circuit of FIG. 4a. The point of intersection Q of the lines C1 and C2 with each other and with the ordinate, indicates the output voltage and is determined by the bias voltage −B. The absolute value |V| of the actual motor speed acts to cancel the output voltage.

In other words, when the motor speed becomes high, the lines C1 and C2 shift lower in accordance with the speed of the motor. At the maximum speed, an output indicated by the lines C1' and C2' may be obtained at the output terminals OT1 and OT2. Therefore, if the motor is stopping, a voltage B is provided at the output terminals OT1 and OT2.

The output terminals OT1 and OT2 of the voltage shift circuit are connected to the input of the firing pulse generating circuit of FIG. 5, for reverse and forward rotation, as hereinafter described. The firing pulse generating circuits control the firing angle of the firing pulse in accordance with the output voltage values from the output terminals OT1 and OT2 and decrease the firing angle as the voltage increases.

When the circuit constants are determined so that the firing pulse generating circuit generates the reference pulse P1 at the timing shown in FIG. 3b when the motor speed is zero, that is, the voltage generated from the output terminals OT1 and OT2 is B, motor acceleration and deceleration controls may be provided as follows.

Acceleration control

When the motor is supposed to be in non-operating condition, the operating point may be found at the point Q1 of FIG. 4b. The firing pulse is therefore generated at the timing of FIG. 3b. Thus, none of the thyristors are fired. As a result, no current flows through the motor.

When maximum speed at forward rotation is commanded, a speed ΔV is provided. However, the motor cannot follow up the speed deviation, and the operating point shifts to the point Q2. In the process, when the operating point shifts from Q1 to Q2, the output voltage of the output terminal OT2 increases and the firing pulse generation timing is hastened. That is, the firing angle decreases gradually, while the forward current flowing through the motor winding gradually increases.

As a result, the motor starts to rotate, and a voltage |V| in accordance with the actual motor speed appears at the input terminal IN3 of FIG. 4a. The output characteristic lines C1 and C2 are thereby shifted lower, and the motor speed reaches the maximum specified speed after a specified period. At such time, the operating point falls to the point Q3. That is, the current indicated by the shaded area in FIG. 3a flows through the motor winding and the motor continues to rotate at the maximum speed.

Deceleration control

When the operating point is at the point Q3, and the deceleration command is given, the command speed starts to reduce. As a result, the speed deviation ΔV rapidly decreases. However, the motor speed cannot follow up the speed deviation ΔV, and the motor still continues to rotate at the maximum speed. That is, the operating point shifts to the point Q4. In the process, when the operating point shifts from the point Q3 to the point Q4, the output voltage at the output terminal OT2 gradually decreases. The firing angle thus gradually becomes large. On the other hand, the current flowing through the motor winding gradually decreases, and becomes zero at the operating point Q4.

Consequently, the firing angle increases and passes the operating point Q5. In the process, when the operating point shifts from the point Q4 to the point Q5, the firing pulse is generated. However, since a motor reverse electromotive force EMF becomes greater than the power supply voltage, the thyristor for forward rotation is reversely biased, so that said thyristor is not fired.

When the operating point exceeds the point Q5, the output voltage becomes smaller than the bias voltage B. Therefore, the firing pulse is delayed from the pulse P1 of FIG. 3b, and at the operating point Q6 the firing pulse is delayed up to the generating time of P1' in FIG. 3c.

When the operating point exceeds the point Q6, the voltage at the output terminal OT2 for forward rotation becomes negative and the voltage at the output terminal OT2 for reverse rotation becomes positive. Thus, the thyristor for reverse rotation is fired. At this time, however, the output voltage at the output terminal OT1 is lower than the bias voltage B between the points Q6 and Q7. For this reason, the firing angle starts to decrease with reference to the generating time P1' in FIG. 3c, and the reverse current in the motor winding gradually increases, as shown in FIG. 3d.

At the operating point Q8, the effect due to the current flowing through the motor winding, which changes from positive to zero to negative, begins to appear and the rotary speed of the motor decreases. The operating point finally returns to the point Q1. At such time, the motor rotation stops.

As hereinfore explained, since the current flowing through the motor winding gradually increases during acceleration and decreases during deceleration, and since it is possible to permit a control current which gradually increases in the negative direction to flow, smooth motor speed control is provided.

In the aforedescribed acceleration, deceleration control, the command speed is specified as the maximum speed. However, when the command speed is small, the operating points shift according to the broken lines C1'' and C2''. As a result, during transfer from forward rotation to reverse rotation, the firing pulse is generated faster than the pulse P1' shown in FIG. 3c. In other words, the reference timing of the firing pulse changes according to the rotary speed of the motor.

FIG. 5 shows the firing pulse generating circuit and FIG. 6 shows waveforms appearing at each part of said firing pulse generating circuit. The firing pulse generating circuit is provided for each of the thyristors S1 to S4. In FIG. 5, an integrating circuit comprises a resistor R and a capacitor C. The integrating circuit produces an output signal which appears at the timing at which the reset pulse Pr, applied to the input terminal IN6, appears. The reset pulse Pr is generated a specific period after the generation of the pulse P1. The reset pulse Pr is generated about 30° after the pulse P1, in the embodiment of FIG. 5. A transistor Tr1 and an amplifier A3 control the charging current of the capacitor C.

If the circuit of FIG. 5 is for a thyristor for forward rotation, the output terminal OT2 of the voltage shift circuit of FIG. 4a is connected to the input terminal IN4 of the amplifier A3. If the circuit of FIG. 5 is for a thyristor for reverse direction, the output terminal OT' of the voltage shift circuit of FIG. 4a is connected to the input terminal IN4 of the amplifier A3. A voltage Vi is applied to the input terminal IN4 of the amplifier A3. A voltage drop produced by the resistor R due to the charging current ic of the capacitor C is applied to the other input of the amplifier A3. The charging current ic is adjusted to a value proportional to the input voltage Vi to the input terminal IN4 by changing the continuity of the transistor TR1.

The amplifier A3, the transistor Tr1 and the resistor R are such that the emitter voltage $V_E$ of said transistor becomes equal to the input voltage Vi. Thus, if it is assumed that the bias voltage for charging the capacitor is VB, the charging current ic, the capacitor charging voltage Vch and the collector voltage $V_C$ of the transistor Tr1 are given by the following equations.

$$ic = V_E/R = Vi/R$$

$$Vch = ict = Vit/R$$

$$V_C = VB - (Vi/R)t$$

One input terminal of an amplifier A4 is connected to the capacitor C and a comparison voltage VR is applied to the other input terminal IN5 of said amplifier. Since the amplifier A4 operates as a comparator, a firing pulse is produced, when the collector voltage $V_C$ of the transistor Tr1 exceeds the comparison voltage VR. That is, the firing pulse may be obtained by differentiating the output of the amplifier A4 via the differentiation circuit DIF.

A flip flop circuit FF is set by the output from the amplifier A4. An output "0" is provided at the $\bar{Q}$ or reset terminal. When the reset pulse Pr is applied to the input terminal IN6, the output "1" is provided at the $\bar{Q}$ or reset terminal.

In the circuit of FIG. 5, the flip flop circuit FF is set by the output pulse from the amplifier A4. When an ouput "0" is provided at the $\bar{Q}$ terminal, a transistor TR2 is switched to its conductive or ON condition, thereby discharging the capacitor C. However, when the flip flop FF is reset by the reset pulse Pr applied to the input terminal IN6, an output "1" is provided at the $\bar{Q}$ terminal. The transistor Tr2 is then switched to its non-conductive or OFF condition. This causes the capacitor C to stop discharging and to start charging.

The charging current ic of the capacitor C is proportional to the output voltage of the voltage shift circuit of FIG. 4a. Therefore, as is clear from the line C1 or the line C2 of FIG. 4b, the charging current varies in accordance with the speed deviation $\Delta V$ and the absolute value $|V|$ of the actual motor speed. As a result, the time until the voltage of the capacitor C reaches the comparison voltage VR changes in accordance with the speed deviation $\Delta V$ and the actual speed $|V|$. The phase of the firing pulse produced as an output by the amplifier A4 also changes, in the aforedescribed manner.

As hereinbefore described, and in accordance with the invention, a DC motor driven by a static Leonard system may be smoothly accelerated or decelerated, providing a good result for driving a load such as a machine tool.

The firing pulse generating circuit provides an output IP, shown in FIG. 6e. The outputs OT1 and OT2 of the voltage shift circuit are connected to the input IN4 of each of four firing pulse generating circuits. The output IP of each of the four firing pulse generating circuits is connected to the control electrode of a corresponding one of the controlled rectifiers.

While the invention has been described by means of a specific example and in a specific embodiment, we do not wish to be limited thereto, for obvious modifications will occur to those skilled in the art without departing from the spirit and scope of the invention.

We claim:

1. A DC motor phase control system having an AC power supply, a first controlled rectifier connected to the power supply and providing a positive rectified output, a second controlled rectifier connected to the power supply and providing a negative rectified output, a DC motor connected to the rectifiers and driven by the rectified outputs of the rectifiers, speed detecting means coupled to the motor for detecting the actual speed of said motor, and error voltage means for generating an error voltage $\Delta V$ in accordance with the deviation between a command speed voltage for the motor and the actual speed of the motor, said DC motor phase control system comprising a firing control circuit connected to the first and second rectifiers for firing either of said rectifiers in accordance with the polarity of the error voltage $\Delta V$ with a firing pulse having a phase angle corresponding to the absolute value of said error voltage, said firing control circuit preventing an excessive current with reverse polarity from flowing rapidly to the armature of said motor during deceleration of said motor by shifting the phase angle of the firing pulse when the polarity of said error voltage is reversed, in accordance with the actual speed of the said motor.

2. A DC motor phase control system as claimed in claim 1, wherein the first controlled rectifier has an anode connected to the power supply voltage, a cathode connected in common to the anode of the second controlled rectifier and the motor and a control electrode connected to the output of the firing control circuit and the second controlled rectifier has a cathode connected to the power supply voltage, an anode connected in common to the cathode of the first controlled rectifier and the motor and a control electrode connected to the output of the firing control circuit.

3. A method of controlling a DC motor in speed and direction of rotation, said motor being controlled in speed and direction of operation in accordance with firing control of a controlled rectifier providing a positive rectified output and another cntrolled rectifier providing a negative rectified output, both rectifiers being powered by an AC power supply, said method comprising the steps of generating an error voltage in accordance with the deviation between a command speed voltage for the motor and the actual speed of the motor;

firing either of the rectifiers in accordance with the polarity of the error voltage with a firing pulse having a phase angle corresponding to the absolute value of said error voltage; and shifting the phase angle of the firing pulse when the polarity of the error voltage is reversed, in accordance with the actual speed of the motor, to prevent an excessive current with reverse polarity from flowing rapidly to the armature of the motor during deceleration of the motor.

4. A method of smooth deceleration control of a DC motor having an armature, said method comprising the steps of continuously varying the armature current of the motor to a negative value from a positive value via zero; and shortening the deceleration time by using negative current as the motor deceleration control current.

* * * * *